United States Patent Office 2,852,379

Patented Sept. 16, 1958

2,852,379

AZIDE RESIN PHOTOLITHOGRAPHIC COMPOSITION

Martin Hepher, Harrow, and Hans M. Wagner, Harrow, Wealdstone, England, assignors to Eastman Kodak Company, Rochester, N. Y., a corporation of New Jersey No Drawing. Application May 4, 1955
Serial No. 506,062

18 Claims. (Cl. 96—91)

This invention relates to photographic processes for various photomechanical purposes, for example, as etching resist stencils and for the production of layers which can be rendered ink-accepting in an image-wise manner and used for lithographic and similar printing processes where "greasy" inks are employed.

It is well known to employ, for making etching resists and for lithographic and similar printing processes, a light-sensitive layer, such as a layer of gelatin impregnated with potassium bichromate, which is exposed to light and is then inked all over, followed by swabbing with water which removes the ink from the portions of the layer not hardened by the exposure to light. Many variations of this process have been proposed.

It is known that aryl azides, for instance azidostyryl ketones and azidostyrylaryl azides can be used to render colloid layers, such as gelatin, casein, polyvinyl alcohol, dextrin, etc., sensitive to light, and that upon exposure, the exposed portions are thereby hardened and made water-insoluble. Such prior proposals for the use of aryl azides have been concerned with the use of aqueous coatings and the production of the stencils therefrom by washing away the unwanted portions of the layer, after exposure, with aqueous solutions. In these proposals, the aryl azides used to sensitize the layers were water-soluble.

We have now found that very valuable photomechanical images, such as stencils and the like, can be produced by employing organic solvent-soluble colloid materials, such as natural and synthetic rubbers, etc., sensitizing these with organic solvent-soluble aryl azides, and after exposure removing the unexposed parts by treatment with an organic solvent.

It is, therefore, an object of our invention to provide improved photographic layers containing aryl azide compounds. Another object is to provide improved printing plates for lithographic, resist, and other related processes. Other objects will become apparent from a consideration of the following description and examples.

The present invention, therefore, provides what may be regarded as an organic solvent system for producing photographic stencils using aryl azides. In the present invention an especially useful azide is:

(1)
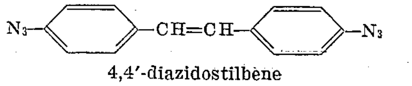
4,4′-diazidostilbene

Other aryl azide compounds which can be employed in our invention include, for example:

(2)
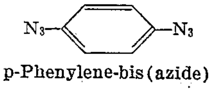
p-Phenylene-bis(azide)

(3)
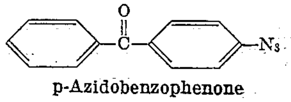
p-Azidobenzophenone (4)
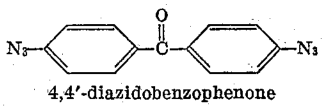
4,4′-diazidobenzophenone (5)
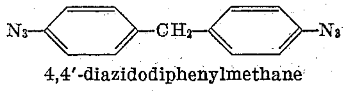
4,4′-diazidodiphenylmethane The aryl azide compounds useful in practicing our invention are substantially insoluble in water, but soluble in the ordinary organic solvents, e. g., trichloroethylene, benzene, toluene, etc. Accordingly, the aryl azide compounds of our invention will generally contain no water-solubilizing groups, such as sulfo, carboxyl, etc. (or alkali metal salts thereof).

By natural rubber, we mean rubber which is commonly known as sulfur-vulcanizable. By synthetic rubber, we mean polymers, and more particularly copolymers, of 1,3-diolefins, such as 1,3-butadiene, isoprene, neoprene, etc. Especially useful copolymers are those containing a minor (less than 50 percent by weight) proportion of unsaturated compound, such as isobutylene, styrene, acrylonitrile, etc. Such synthetic rubbers are known commercially as Buna S, Buna N, Butyl, etc. rubbers (OS). These rubbers, natural and synthetic, are employed in our invention in the form of a dispersion or solution. The concentration of solids in the solution (or dispersion) can be varied, although we have generally found that from about 20 to 60 percent by weight of solids is convenient for the purposes of our invention.

Other organic solvent-soluble colloid materials which can be employed in practicing our invention comprise cyclized rubber (of the type employed in U. S. Patents 2,371,736 and 2,381,180, or described by Yehman et al. in "Rubber Tech. Conf., London," Preprint No. 35, 12 pp. (May 1938), for example), oxidized rubber (of the type described in U. S. Patent 2,132,809, British Patent 533,630, British Patent 537,146, etc.), etc.

Although the preferred colloids for use in the present invention are natural and synthetic rubbers, it is possible to use other colloids, for example, certain polymeric resins, which are soluble in organic solvents. The sensitive layer can be produced by coating on a suitable support, for example, metal sheet (e. g., aluminum, magnesium, zinc, etc.), glass, cellulose ester film, polyvinyl acetal film, etc. In order to produce a photomechanical image, the layer is exposed image-wise, for example, in contact with a line or halftone transparency to strong ultar-violet light and blue radiation (arc or mercury vapor), and the unexposed areas are removed by dissolving in an organic solvent. The effect of the azide is not always to insolubilize the colloid (or resin) to all organic solvents, and in some cases it is necessary to choose the solvent with a certain degree of care. In the case of most rubbers, the choice is fairly wide.

When using synthetic rubbers in the present invention, it is desirable to choose those which contain some unsaturated groups in the molecule. Examples of synthetic resins containing unsaturation which can be used in the present invention are those based on copolymers of butadiene and styrene, or butadiene and acrylonitrile. The cyclized rubber has good adhesion to metal and excellent resistance to alkalies and acids; small quantities of chlorinated rubber included with this material improve further its adhesion to metal.

It appears that hardening by exposure only takes place with resins that are almost completely free from polar groupings. On the other hand, it is possible to include such materials (i. e., those containing polar groupings) together with those that are insolubilized by the azide, and by this means, superior resists are sometimes produced. For instance, small quantities of hydrogenated resin ester (Staybelite Ester) added to sensitized cyclized rubber improve its adhesion to some metals, but an excess causes the azide not to insolubilize the rubber on exposure.

Other resins that shown some tendency to insolubilize in the presence of the aryl azide are bitumen (more sensitive in the presence of azide than without) and condensation products obtained from epichlorohydrin and either bis-phenol or diphenylolpropane.

The following examples illustrate the invention:

*Example 1*

A solution was prepared as follows:

| | Parts |
|---|---|
| Natural smoked rubber | 1.5 |
| Trichloroethylene | 100 |

To this were added 20 parts of:

| | Parts |
|---|---|
| 4,4′-diazidostilbene | 3 |
| Trichloroethylene (hot) | 100 |

The mixture was coated onto a sheet of copper by pouring, or by whirling, but if the latter method was used, it was found desirable to replace 30% of the trichloroethylene by toluene.

When dry the layer was exposed in contact with a line or halftone transparency to mercury vapor illumination in the known manner. A suitable exposure was 3 minutes at 18 inches from two 400 watt high pressure mercury vapor tubes (e. g., Osira lamps by General Electric Co., Ltd.).

After exposure the plate was placed in a dish or tank containing trichloroethylene and agitated freely for approximately 2 minutes, whereupon the unexposed rubber was removed. The image remaining on the plate was then rinsed with clean solvent (or washed under running water) and then dried.

The preparation of 4,4′-diazidostilbene was carried out as follows:

Benzyl chloride was nitrated (Alway, "J. Am. Chem. Soc., vol. 24, 1062) to yield p-nitrobenzylchloride. Treatment of this compound with alcoholic potassium hydroxide (Walden, Kerubourm, "Ber.," vol. 23, 1959) gave 4,4′-dinitrostilbene which was reduced with tin and hydrochloric acid, yielding 4,4′-diaminostilbene (Elbs, Hoermoum, "J. pr. Chem." (2), vol. 39, 502).

4,4′-diaminostilbene (4.3 g.) was suspended in water (50 cc.) and conc. hydrochloric acid (15 cc.) was added. With stirring and external cooling, sodium nitrite (2.7 g.) in water (20 cc.) was slowly added below the surface of the liquid. Stirring was continued for two hours with external cooling, and then sodium azide (2.6 g.) in water (20 cc.) was added slowly. Frothing occurred and a pink precipitate came down. After stirring for a further two hours at room temperature, the mixture was allowed to stand overnight. The precipitate was filtered and recrystallized from a benzene/methanol mixture. Small plates of 4,4′-diazidostilbene (M. P. 163–164° C.) were collected. Yield: 4.5 g.; 86%.

*Example 2*

In place of the natural rubber in the previous example the same quantity of butadiene-acrylonitrile copolymer was used. Such a material is sold under the name of Perbunan and Hycar, with varying proportions of acrylonitrile. In this example, Perbunan W was used, which contains 27–28% acrylonitrile. Other grades up to 38% acrylonitrile content have also been used.

*Example 3*

In place of the natural rubber in Example 1, a similar quantity of butadiene-styrene copolymer was used.

*Example 4*

The following solution was prepared:

| | Parts |
|---|---|
| Cyclized rubber solution [1] | 40 |
| Trichloroethylene | 100 |
| 4,4′-diazidostilbene | 2 |

[1] Such as that sold as Vulcaloc cement 189B by British Tyre and Rubber Co. Ltd. which is approximately 27–28% solids in petroleum.

This was coated and processed as described in Example 1.

*Example 5*

The following solution was prepared:

| | Parts |
|---|---|
| Cyclized rubber | 30 |
| Chlorinated rubber (Alloprene B., I. C. I.) | 10 |
| Trichloroethylene | 100 |
| 4,4′-diazidostilbene | 2 |

This was coated and exposed as described in Example 1.

*Example 6*

In place of the azide given in Example 4, the following compound was used:

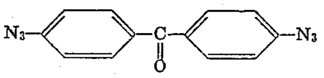

4,4′-diazidobenzophenone

The exposure was increased to 6 minutes for this example and processing was similar to that in Example 4.

The preparation of 4,4′-diazidobenzophenone was carried out as follows:

4,4′-diaminobenzophenone was first prepared by the method of Fierz and Koechlin ("Helv. Chim. Acta," 1918, vol. 1, 220). Then, the 4,4′-diaminobenzophenone (6.36 g.) was suspended in water (60 cc.) and diazotized in the usual way with conc. hydrochloric acid (23 cc.) and sodium nitrite (4.2 g.) dissolved in water (20 cc.). After stirring for two hours, a solution of sodium azide (4.0 g.) in water (20 cc.) was added with stirring below the surface of the liquid. Frothing occurred and the compound precipitated. Stirring was continued at room temperature for two hours and the mixture allowed to stand overnight. It was filtered and crystallized from ethanol yielding leaflets of 4,4′-diazidobenzophenone, M. P. 147° C. (5.5 g.; 69.5%).

Calc. for $C_{13}H_8ON_6$: N, 31.8%. Found: N, 32.1%

*Example 7*

| | Parts |
|---|---|
| Epikote 1007 resin [1] | 10 |
| Methyl ethyl ketone | 100 |
| 4,4′-diazidostilbene | 1–5 |
| Trichlorethylene | 30 |

[1] Epikote Resins are sold by Shell Chemicals Ltd. and consist of condensation products of epichlorohydrin and diphenylolpropane.

This solution was coated and exposed in a similar way to that described in Example 4 and then developed in:

| | Parts |
|---|---|
| Xylene | 3 |
| Methyl Cellosolve acetate | 2 |

The image obtained was somewhat porous owing to a form of reticulation taking place.

*Example 8*

| | Parts |
|---|---|
| Bitumen (sold as sensitized bitumen by Hunter Penrose, Ltd.) | 5 |
| 4,4′- diazidostilbene | 2 |
| Trichloroethylene | 80 |
| Methyl ethyl ketone | 20 |

This was coated and exposed for 5 minutes and then developed in mineral spirits.

*Example 9*

| | Parts |
|---|---|
| Crestapon 601 [1] | 16 |
| Trichloroethylene | 100 |
| Alloprene B. (chlorinated rubber by I. C. I.) | 4 |
| Ethyl acetate | 30 |
| 4,4′- diazidostilbene | 2 |

[1] A condensation product of epichlorohydrin and bisphenol sold by Scott Bader Ltd.

Coated and exposed as in Example 4 and developed in trichloroethylene (75 parts) and ethyl acetate (25 parts).

*Example 10*

| | Parts |
|---|---|
| Cyclized rubber (as in Example 4) | 20 |
| 4,4′- diazidodiphenylmethane | --- |
| Trichloroethylene | 80 |

Coated and exposed for 15 minutes and then developed in benzene.

4,4′-diazidodiphenylmethane was prepared as follows: 4,4′-diaminodiphenylmethane (9.9 g.) was diazotized in the usual way with conc. hydrochloric acid (38 cc.) and a solution of sodium nitrite (6.9 g.) in water (20 cc.). The diazonium salt solution was stirred for two hours and then a solution of sodium azide (6.5 g.) in water (20 cc.) was run in slowly below the surface of the liquid. An oil separated and after stirring for a further two hours the mixture was allowed to stand in the refrigerator overnight. The oil had solidified, the solid was filtered and recrystallized from ethanol yielding light brown leaflets of 4,4′-diazidodiphenylmethane, M. P. 39–40° C.

As shown in the above examples, our invention contemplates the use of organic solvent-soluble colloid materials which contain substantially no polar groupings (and hence, are water-insoluble), although natural rubber and butadiene copolymers have been found to be particularly useful.

The aryl azide compounds employed in our invention are also water-insoluble and substantially free of polar groupings. Such aryl azide compounds can be prepared as described in the above examples, or in "Richter's Organic Chemistry," vol. III (Elsevier, 1946), "Berichte," vol. 43, page 2765, and "J. C. S.," vol. 20, page 94. Among the most useful of such aryl azide compounds are those represented by the following general formulas:

(I) $$N_3{-}R{-}CH{=}CH{-}R_1$$

(II) $$N_3{-}R{-}\overset{\overset{\large O}{\|}}{C}{-}R_1$$

(III) $$N_3{-}R{-}R_1$$

wherein R represents a monocyclic arylene group (e. g., phenylene, methylphenylene, nitrophenylene, etc.) and $R_1$ represents a monocyclic aryl group (e. g., phenyl, azidophenyl, tolyl, azidotolyl, etc.).

The epichlorohydrin resins referred to above are, of course, known substances. See, for example, U. S. Patent 2,444,333 and British Patent 579,698.

What we claim as our invention and desire secured by Letters Patent of the United States is:

1. A light-sensitive coating composition comprising an organic solvent, an organic solvent-soluble colloid containing substantially no polar groupings selected from the group consisting of natural rubber, synthetic rubber, cyclized rubber, and oxidized rubber, and a water-insoluble aryl azide compound, said composition being adapted to produce a light-sensitive coating in which an image can be formed by exposure to light and washing in an organic solvent.

2. A light-sensitive coating composition comprising a solution in an organic solvent of natural rubber and a water-insoluble aryl azide compound, said composition being adapted to produce a light-sensitive coating in which an image can be formed by exposure to light and washing in an organic solvent.

3. A light-sensitive coating composition comprising a solution in an organic solvent of synthetic rubber and a water-insoluble aryl azide compound, said composition being adapted to produce a light-sensitive coating in which an image can be formed by exposure to light and washing in an organic solvent.

4. A light-sensitive coating composition comprising a solution in an organic solvent of cyclized rubber and a water-insoluble aryl azide compound, said composition being adapted to produce a light-sensitive coating in which an image can be formed by exposure to light and washing in an organic solvent.

5. A light-sensitive coating composition comprising a solution in an organic solvent of a condensation polymer of epichlorohydrin and bis-phenol and a water-insoluble aryl azide compound, said composition being adapted to produce a light-sensitive coating in which an image can be formed by exposure to light and washing in an organic solvent.

6. A light-sensitive coating composition comprising a solution in an organic solvent of a condensation polymer of epichlorohydrin and diphenylolpropane and a water-insoluble aryl azide compound, said composition being adapted to produce a light-sensitive coating in which an image can be formed by exposure to light and washing in an organic solvent.

7. A light-sensitive coating composition comprising a solution in an organic solvent of natural rubber and 4,4′-diazidostilbene, said composition being adapted to produce a light-sensitive coating in which an image can be formed by exposure to light and washing in an organic solvent.

8. A light-sensitive coating composition comprising a solution in an organic solvent of a rubbery polymer of a 1,3-diolefin and 4,4′-diazidostilbene, said composition being adapted to produce a light-sensitive coating in which an image can be formed by exposure to light and washing in an organic solvent.

9. A light-sensitive coating composition comprising a solution in an organic solvent of cyclized rubber and 4,4′-diazidostilbene, said composition being adapted to produce a light-sensitive coating in which an image can be formed by exposure to light and washing in an organic solvent.

10. A light-sensitive coating composition comprising a solution in an organic solvent of a condensation polymer of epichlorohydrin and bis-phenol and 4,4′-diazidostilbene, said composition being adapted to produce a light-sensitive coating in which an image can be formed by exposure to light and washing in an organic solvent.

11. A light-sensitive coating composition comprising a solution in an organic solvent of a condensation polymer of epichlorohydrin and diphenylolpropane, said composition being adapted to produce a light-sensitive coating in which an image can be formed by exposure to light and washing in an organic solvent.

12. A light-sensitive coating composition comprising a solution in an organic solvent of an organic solvent-soluble colloid containing substantially no polar groupings selected from the group consisting of natural rubber, synthetic rubber, cyclized rubber, and oxidized rubber, a diluent selected from the group consisting of chlorinated rubber and a hydrophilic polymeric resin containing polar groupings, and a water-insoluble aryl azide compound, said composition being adapted to produce a light-sensitive coating in which an image can be formed by exposure to light and washing in an organic solvent, the quantity of hydrophilic polymeric resin employed being such that the light-sensitivity of said composition is not reduced below a practical value.

13. A light-sensitive photographic material comprising a support having thereon a substantially dry composition comprising an organic solvent-soluble colloid containing substantially no polar groupings selected from the group consisting of natural rubber, synthetic rubber, cyclized rubber, and oxidized rubber and a water-insoluble aryl azide compound, said material being adapted to produce a photographic image upon exposure to light and washing in an organic solvent.

14. A light-sensitive photographic material comprising a support having thereon a substantially dry composition comprising natural rubber and a water-insoluble aryl azide compound, said material being adapted to produce a photographic image upon exposure to light and washing in an organic solvent.

15. A light-sensitive photographic material comprising a support having thereon a substantially dry composition comprising synthetic rubber and a water-insoluble aryl azide compound, said material being adapted to produce a photographic image upon exposure to light and washing in an organic solvent.

16. A light-sensitive photographic material comprising a support having thereon a substantially dry composition comprising cyclized rubber and a water-insoluble aryl azide compound, said material being adapted to produce a photographic image upon exposure to light and washing in an organic solvent.

17. A light-sensitive photographic material comprising a support having thereon a substantially dry composition comprising a condensation polymer of epichlorohydrin and bis-phenol and a water-insoluble aryl azide compound, said material being adapted to produce a photographic image upon exposure to light and washing in an organic solvent.

18. A light-sensitive photographic material comprising a support having thereon a substantially dry composition comprising a condensation polymer of epichlorohydrin and diphenolylpropane and a water-insoluble aryl azide compound, said material being adapted to produce a photographic image upon exposure to light and washing in an organic solvent.

References Cited in the file of this patent

UNITED STATES PATENTS

| | | |
|---|---|---|
| 2,675,315 | Staehle et al. | Apr. 13, 1954 |
| 2,687,958 | Neugebauer et al. | Aug. 31, 1954 |
| 2,692,826 | Neugebauer et al. | Oct. 26, 1954 |